United States Patent
Vandegrift et al.

(10) Patent No.: US 9,015,704 B2
(45) Date of Patent: Apr. 21, 2015

(54) CONTEXT AGENT INJECTION USING VIRTUAL MACHINE INTROSPECTION

(75) Inventors: Marshall Thomas Vandegrift, Atlanta, GA (US); Kevin Michael Skapinetz, Mableton, GA (US); Timothy David Dodd, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1526 days.

(21) Appl. No.: 12/053,999

(22) Filed: Mar. 24, 2008

(65) Prior Publication Data

US 2009/0241109 A1    Sep. 24, 2009

(51) Int. Cl.
G06F 9/455        (2006.01)
G06F 9/445        (2006.01)

(52) U.S. Cl.
CPC ............ *G06F 9/45533* (2013.01); *G06F 9/445* (2013.01); *G06F 9/45558* (2013.01); *G06F 2009/45591* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 6,634,019 B1 | 10/2003 | Rice et al. | |
| 6,694,362 B1 | 2/2004 | Secor et al. | |
| 7,065,745 B2 | 6/2006 | Chan | |
| 7,382,970 B2 * | 6/2008 | Duruoz | 386/239 |
| 7,415,710 B1 * | 8/2008 | Yan et al. | 718/105 |
| 7,685,474 B2 * | 3/2010 | Viljoen | 714/46 |
| 7,689,784 B2 * | 3/2010 | Suzuoki | 711/154 |
| 8,141,075 B1 * | 3/2012 | Chawla et al. | 718/1 |
| 2002/0018487 A1 | 2/2002 | Chen et al. | |
| 2002/0116555 A1 * | 8/2002 | Somers et al. | 710/26 |
| 2004/0153666 A1 * | 8/2004 | Sobel | 713/201 |
| 2005/0188365 A1 * | 8/2005 | Lee | 717/168 |
| 2005/0234846 A1 * | 10/2005 | Davidson et al. | 707/1 |
| 2005/0268298 A1 * | 12/2005 | Hunt et al. | 718/1 |
| 2007/0240160 A1 * | 10/2007 | Paterson-Jones et al. | 718/104 |

OTHER PUBLICATIONS

Building Trustworthy Intrusion Detection Through VM Introspection, Baiardi et al., 2007.*
Toward High Assurance Networks of Virtual Machines, Baiardi et al., 2007.*
Shi et al., "An Integrated Framework for Dependable and Revivable Architectures Using Multicore Processors", IEEE Computer Society, Proceedings of the 33rd International Symposium on Computer Architecture (ISCA'06), pp. 1-12.
Dearle, "Software Deployment, Past, Present and Future", 2007 IEEE Computer Society, Future of Software Engineering (FOSE'07), pp. 1-16.

* cited by examiner

*Primary Examiner* — Mengyao Zhe
(74) *Attorney, Agent, or Firm* — Yee & Associates, P.C.; Lisa J. Ulrich

(57) ABSTRACT

A computer implemented method, apparatus, and computer usable program code for executing a process within a virtual machine. A module is injected into an operating system for the virtual machine to form an injected module. The injected module is executed to load an agent process within an application space within the virtual machine. Execution of the agent process is initiated by the injected module.

15 Claims, 2 Drawing Sheets

CONTEXT AGENT INJECTION USING VIRTUAL MACHINE INTROSPECTION

BACKGROUND OF THE INVENTION

1. Field of the Invention

The present invention relates generally to virtual machine environments, and more specifically to monitoring virtual machines.

2. Background Description

A virtual machine is a logical partition or share of the resources (including CPU, memory, I/O, etc.) of a real computer. One or more computer programs (such as applications and a "guest" operating system to control execution of the applications in its virtual machine) execute in each virtual machine such that the computer programs executing within each virtual machine execute with the resources allocated to the virtual machine. Each computer program executes in a virtual machine in a similar manner to executing on a real computer. A control program or base portion of a virtual machine operating system forms the virtual machines by partitioning or allocating the share of computer resources to each virtual machine, and also can start and stop virtual machines and serve as a communication pathway between virtual machines. One purpose of a virtual machine environment is to separate the computer programs executing in different virtual machines from each other and divide the resources between them. Another purpose is to allow different guest operating systems to execute in the same real computer. Software implementation of a data processing system and may execute programs just like a real data processing system. A virtual machine may take the form of a complete system platform that executes a computer operating system. Software running on a virtual machine is limited to accessing resources and other abstractions provided by the virtual machine.

Virtual machines have many uses. For example, a virtual machine may be used as a sandbox for an operating system that is not trusted or an operating system that is under development. A virtual machine also may provide instructions and architecture that is somewhat different from that used by the physical data processing system on which the virtual machine executes. Further, in developing operating systems, virtual machines provide faster debugging access and faster reboots. Virtual machines are also employed to run multiple operating systems on a data processing system. In this manner, a single computer may be time shared between several operating systems.

Virtual machine introspection (VMI) provides capabilities to monitor and alter the state of a virtual machine. This type of introspection may be used to observe the execution of operating systems. This type of technique may be used to introspect information about the state of another virtual machine running in the context of an isolated execution environment. Introspection involves obtaining a view of resource state for one or more virtual machines executing on a computer without accessing the virtual machine itself. Introspection includes, for example, obtaining information about, for example, memory usage and processor state by a particular virtual machine.

BRIEF SUMMARY OF THE INVENTION

The illustrative embodiments provide a computer implemented method, apparatus, and computer usable program code for executing a process within a virtual machine. A module is injected into an operating system for the virtual machine to form an injected module. The injected module is executed to load an agent process within an application space within the virtual machine. Execution of the agent process is initiated by the injected module.

DETAILED DESCRIPTION OF THE INVENTION

Figure 1:
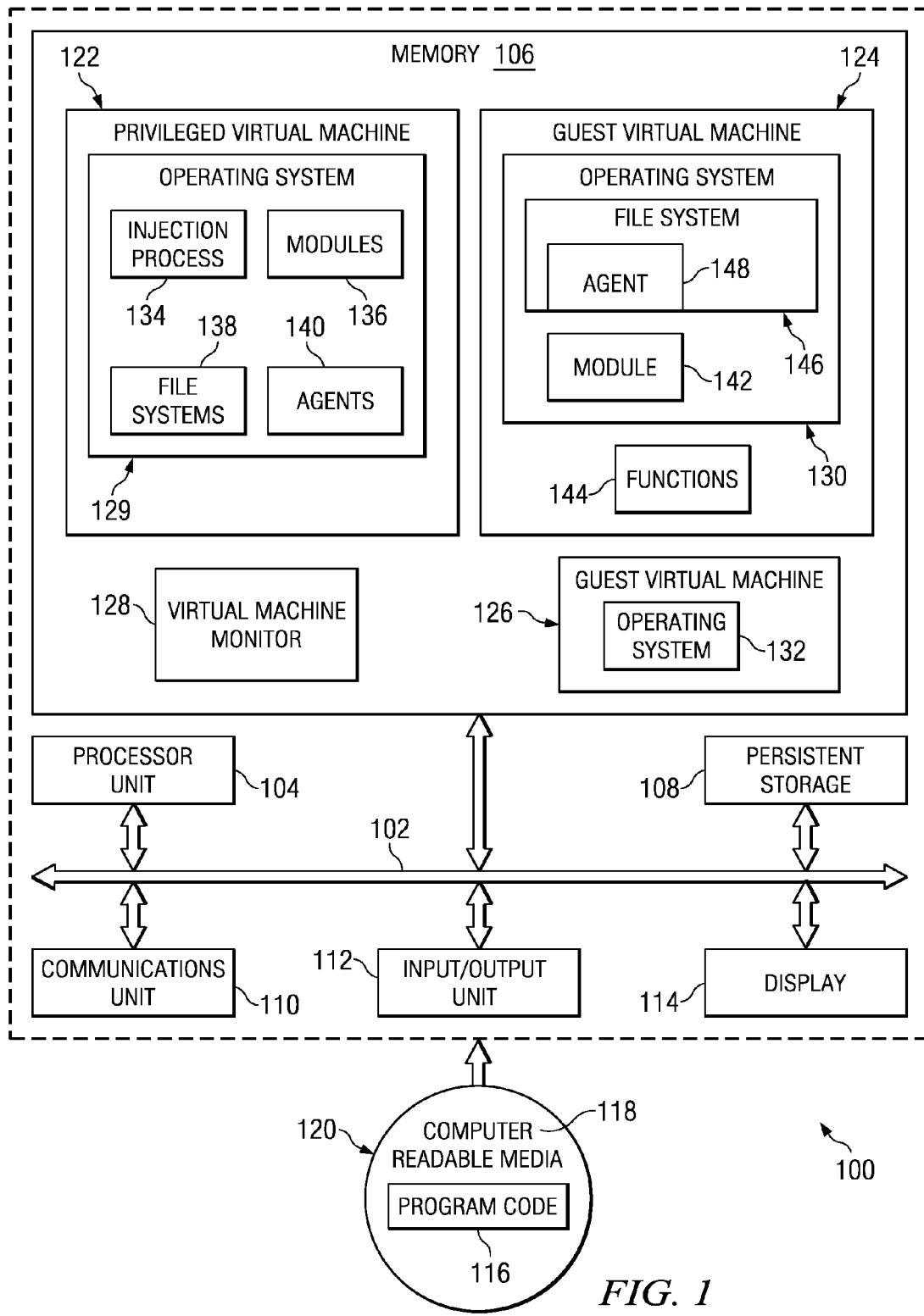
FIG. 1 is a diagram of a data processing system in accordance with an illustrative embodiment of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer readable storage device(s) may be utilized. A computer readable storage device in these examples is storage capable of storing computer program code. The computer-readable storage device may be, for example but not limited to, an electronic, magnetic, optical, electromagnetic, or semiconductor system, apparatus, device, or other suitable storage device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. The computer program code may be downloaded from a network to a computer where it is installed on a computer readable storage device, such as a random access memory, a read only memory, or other suitable storage device.

In the context of this document, a tangible computer-readable storage device may be any storage device that can store the program for use by or in connection with the instruction execution system, apparatus, or device. The terms "computer-readable storage device"and "computer-readable storage devices"do not mean a signal propagation media such as a copper transmission cable, optical transmission fiber or wireless transmission media.

Computer program code for carrying out operations of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The different illustrative embodiments recognize that in theory, virtual machine introspection provides an ability to introspect data for virtual machines along with strong isolation. The different illustrative embodiments also recognize that in practice, challenges may be present in relying on virtual machine introspection to obtain operating system and application level information from one or more guest virtual machines. For example, the different illustrative embodiments recognize that introspection of memory regions for virtual machines commonly require prior knowledge of the kernel structures being monitored in the virtual machines to reliably map addresses and correct extract kernel data. The different illustrative embodiments also recognize that different kernels altered by custom compiles, kernel patches, or other modifications may require adjustments to the introspection routines. Changes to the introspection routines may be needed when variations in different kernels result in changes in memory usage. With operating system kernels, knowledge of hardware memory usage may be used to look at the data stored in that memory to infer what is going on within a virtual machine.

At a kernel level, the map of the kernel may have a defined data range that does not change. However, the different embodiments recognize that at an application level, however, more information about the application may be needed. For example, the application may be fragmented within memory making it harder to obtain a view or other information of the application. Identifying information about applications executing within a virtual machine is more difficult than for an operating system because of the difficulty in putting together pieces of low level information, such as structures and system calls made by applications to determine what is going on within the virtual machine.

Also, the different illustrative embodiments recognize that obtaining user level information in a scalable manner using virtual machine introspection may be more difficult when running outside of the execution context of the guest virtual machine. In this type of environment, when the observing virtual machine does not have the capability to use operating system application programming interfaces (APIs), the guest virtual machine cannot directly examine the actions of the running applications within a virtual machine. Further, the different illustrative embodiments recognize that although it may be possible to build an operating system and application level security data using low level virtual machine introspection constructs, performing this task in a scalable and time sensitive manner may be challenging.

Thus, the different illustrative embodiments employ an approach in which virtual machine introspection is used to inject a kernel module into a guest virtual memory address space. This kernel level module creates a user level process running within the context of a virtual machine. This process is also referred to as an agent, context agent, or agent process. In this manner, virtual machine introspection may be used to inject, execute, communicate, and/or verify the integrity of an agent.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multiprocessor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable storage device 118 that is selectively removable and may be loaded onto or transferred to data processing system 100 for execution by processor unit 104. Program code 116 and computer readable storage device 118 form computer program product 120 in these examples. In one example, computer readable storage device 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable storage device 118 also may take the form of a persistent storage, such as a hard drive, a thumb drive, or a flash memory that is connected to data processing system 100. In some instances, computer readable storage device 118 may not be removable.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable storage device 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In this illustrative example, privileged virtual machine 122, guest virtual machine 124, guest virtual machine 126, and virtual machine monitor 128 execute within memory 106. Virtual machine monitor 128 is layer of software that emulates the hardware of a computer system. Virtual machine monitor 128 is a virtualization platform that allows multiple operating systems to run on a computer at the same time. Virtual machine monitor 128 may create privileged virtual machine 122, guest virtual machine 124, and guest virtual machine 126.

In these examples, operating system 129 executes on privileged virtual machine 122, operating system 130 executes on guest virtual machine 124, and operating system 132 executes on guest virtual machine 126. Privileged virtual machine 122, guest virtual machine 124, and guest virtual machine 126 may be allocated resources within data processing system 100. In these examples, different virtual machines may execute different types of operating systems. For example, operating system 130 may be a Linux operating system, while operating system 132 may be a Unix operating system. In other embodiments, the operating systems may be of the same type.

Virtual machine monitor 128 may allocate resources within data processing system 100 to the different virtual machines. For example, the different virtual machines may be assigned one or more processors within processor unit 104 or may be assigned time slices within one or more processors within processor unit 104. As another example, the different virtual machines may each have different portions of memory 106 assigned or associated with the virtual machines for use by those virtual machines. This partitioning or sharing of resources may occur for other resources, such as access to input/output unit 112 and display 114. In other words, virtual machine monitor 128 may allocate different resources within data processing system 100 to these virtual machines. These resources may be shared or exclusively used by the different virtual machines.

In these illustrative examples, privileged virtual machine 122 is a virtual machine that may be used to access and control other virtual machines within memory 106, such as guest virtual machine 124, and guest virtual machine 126. These guest virtual machines do not have access to other virtual machines and operate in a self contained manner with respect to other virtual machines within memory 106. Virtual machine monitor 128 may perform different operations with respect to guest virtual machine 124 and guest virtual machine 126 through privileged virtual machine 122. These operations include, for example, virtual machine introspection, injecting code into guest virtual machines, and other suitable operations.

In the different advantageous embodiments, virtual machine introspection is a technique that may be implemented using virtual machine monitor 128 and privileged virtual machine 122. Processes for virtual machine introspection may be implemented within privilege virtual machine 122 in these examples.

The different advantageous embodiments provide for executing an agent on a virtual machine using virtual machine introspection. Virtual machine introspection is used to inject an agent into a virtual machine, such as guest virtual machine 124 or guest virtual machine 126. In these examples, the agent executes in an application space within an operating system, such as operating system 130 or operating system 132. The agent could be injected into other portions of the operating system in addition to the application space, depending on the implementation or need. Application space is an area of virtual memory that is set aside for user applications to execute. The application space may be swapped in and out of physical memory to a storage device, such as a disk. The kernel space is the area of virtual memory set aside for the kernel, kernel extensions, device drives, and other suitable components to execute. This area of memory is typically not swappable.

As depicted, operating system 129 includes injection process 134, modules 136, file systems 138, and agents 140. Injection process 134 may be used to place a copy of a module within modules 136 into a guest virtual machine. In this example, injection process 134 may load module 142 into operating system 130 for execution. The selected module from modules 136 loads an agent from agents 140 into a guest virtual machine in these examples. Each module in modules 136 operates on a kernel level in these examples. The particular module selected for use in operating system 130 may depend on the particular type of operating system.

In loading an agent from agents 140 into an operating system, the manner in which an agent may be loaded may vary depending on the particular operating system. As a result, different modules from modules 136 may be used depending on the particular operating system. An agent selected from agents 140 may have different functions. For example, an agent may provide anti-viral processes, asset management processes, compliance enforcement processes, and/or other suitable processes.

In this depicted example, injection process 134 injects module 142 from modules 136 into operating system 130. In these examples, the term "inject" means to place or load a software component or other program code into a virtual machine for use by the virtual machine. The component may be, for example, a software process or some other suitable data structure. In these examples, injection process 134 injects module 142 into operating system 130 by allocating space within memory 106 that is assigned to guest virtual machine 124. Module 142 is placed into the allocated space for execution by operating system 130. Module 142 may be similar to, for example, a device driver or other software component that executes within the kernel space of operating system 130.

In injecting module 142 into operating system 130, injection process 134 may stop execution of the thread or process within operating system 130 in which the thread has sufficient permissions to execute different functions. For example, a thread for an interrupt handler may not be selected. Injection process 134 then makes a call for allocation of memory for guest virtual machine 124. This call may be made by modifying the virtual hardware state. This modification includes, for example, modifications needed to transfer execution to a selected function from functions 144. This selected function may be, for example, a memory allocation function for guest virtual machine 124. Injection process 134 provides this function with arguments needed to allocate memory for module 142. Injection process 134 then halts the execution of guest virtual machine 124. Module 142 is placed into memory 106 in the allocated memory by injection process 134.

Injection process 134 then transfers the execution to another function from functions 144 within guest virtual machine 124, such as a loading function. Injection process 134 provides that function with the argument needed to load module 142 for execution by operating system 130. Injection process 134 then restores guest virtual machine 124 to the state that was present prior to the halting execution of a thread and allows guest virtual machine 124 to execute from that state. At this point, the loading function loads module 142 for execution by operating system 130 as shown in this example.

Injection process 134 also may load file system 146 containing agent 148 into the memory used by guest virtual machine 124 by allocating memory within guest virtual machine 124 for file system 146. File system 146 may be loaded into guest virtual machine 124 at the same time module 142 is injected into guest virtual machine 124. Of course, file system 146 may be injected or loaded into guest virtual machine 124 at other times prior to the execution of module 142.

When module 142 executes, module 142 mounts file system 146 and executes agent 148. In these examples, agent 148 may be comprised of a set of software components. A set as used herein refers to one or more items. Module 142 then executes agent 148 from file system 146. In this manner, agent 148 may execute within operating system 130. Agent 148 executes within the application space of operating system 130 in these examples. In this manner, agent 148 may obtain information about different applications executing within operating system 130. Examples of information that may be obtained include, without limitation, an identification of a set of installed packages or applications, name of files accessed by applications in the guest virtual machine, contents of files accessed by applications in the guest virtual machine, the contents of email message received, and/or other suitable information. In the illustrative embodiments, file systems 138 contains disk images of file systems that may be mounted by the different virtual machines. An agent from agents 140 may be placed into a file system in file systems 138. A module from modules 136 capable of mounting a file system from file systems 138 and executing an agent placed into file systems 138 is selected.

The illustration of three virtual machines is presented for purposes of illustrating one embodiment. Other embodiments may include other numbers of virtual machines and other types of operating systems. For example, in other embodiments three or four virtual machines may be present in which the virtual machines are all the same type. The illustration of this particular example is not meant to limit the manner in which different illustrative embodiments may be implemented. The illustration of data processing system 100 and the different data structures and software components executing within memory 106 are not meant to imply architectural limitations to the manner in which data processing system 100 may be implemented and to the manner in which various software components may be implemented.

Figure 2:
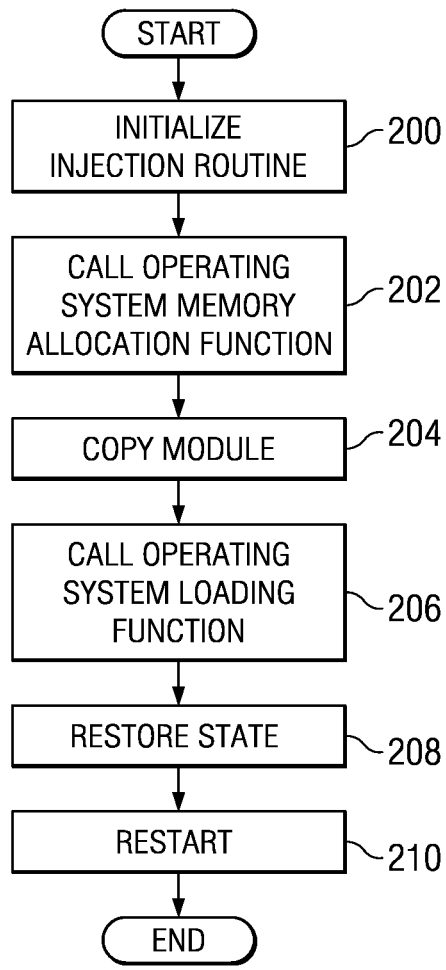
FIG. 2 is a flowchart of a process for injecting a module in accordance with an illustrative embodiment.

Turning now to FIG. 2, a flowchart of a process for injecting a module is depicted in accordance with an illustrative embodiment. The injection process illustrated in FIG. 2 may be implemented in a software component, such as injection process 134 in FIG. 1.

In this example, the injection process initializes an injection routine (step 200). In step 200, the injection process may locate the needed functions in the operating system and setup the file system for the context agent. The injection process calls the operating system memory allocation function (step 202). Step 202 may include providing the appropriate arguments for the module to be injected into the operating system. The injection process then copies the module into the allocated memory (step 204). The injection process calls the operating system loading function (step 206). This call is made to cause the loading of the module from the allocated memory. The injection process then restores the state of the operating system (step 208). The injection process restarts the operating system (step 210), with the process terminating thereafter.

The steps performed by the injection process to inject a module, such as module 142 in FIG. 1, into a guest machine may vary depending on the implementation. For example, the steps may vary depending on the type of operating system in which the module is to be injected. For example, with Linux, injection of the module is the interface exposed to user context. With this type of operating system, the injection process looks for a thread that belongs to a user mode process running as a root. The identification of this thread may be made by the injection process in a number of different ways. Process credentials may be checked and the credentials may be temporarily modified to those needed. In another example, a process with a desired property may be created.

If this type of embodiments is used, the injection process may trap execution at a frequently reached point in the kernel context. This point may be, for example, a schedule entry point. The injection process may then divert execution to call_usermodehelper( ) etc to run insmod on an arbitrary kernel module. Injection process 134 in FIG. 1 may then trap execution at sys_init_module( ). With this type of embodiment, the module is loaded from user memory pages. This type of process may include allocating a target buffer using sys_mmap2( ) or relatives rather than using a Linux kernel memory allocation function.

These different variations for injecting code into an operating system are specific to Linux as one example. Of course, other operating systems may result in other types of variations in the process for injecting a module into a guest virtual machine.

Figure 3:
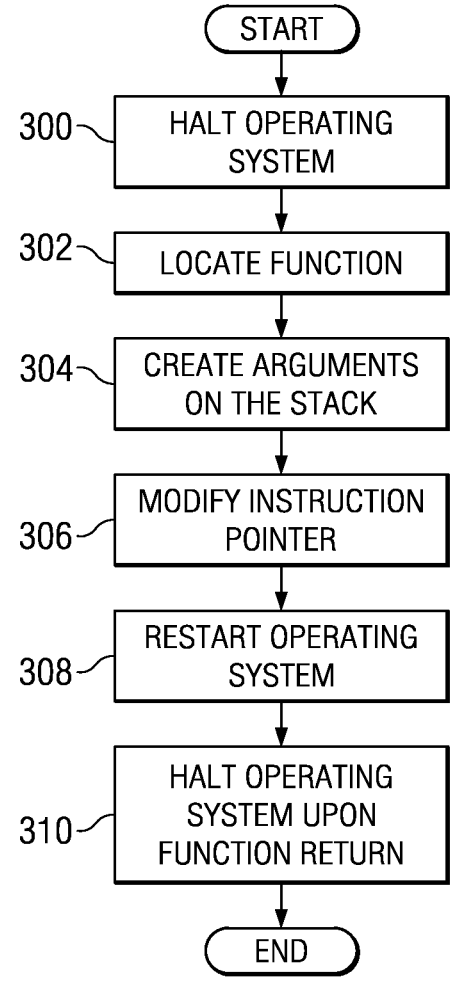
FIG. 3 is a flowchart of a process to call an operating system function in accordance with an illustrative embodiment.

With reference next to FIG. 3, a flowchart of a process to call an operating system function is depicted in accordance with an illustrative embodiment. The process illustrated in FIG. 3 is a more detailed example of a process that may be used in step 202 and/or step 206 in FIG. 2. More specifically, the process illustrated in this figure may be used by an injection process, such as injection process 134 in FIG. 1 to call functions, such as functions 144 in FIG. 1.

The injection process halts the execution of the operating system (step 300). Thereafter, the injection process locates the desired function (step 302). In these examples, the function may be, for example, a memory allocation function or a loading function. Next, the injection process creates arguments on the stack (step 304). For a memory allocation function, these arguments may include, for example, amount of memory to allocate, a memory pool from which the allocation is to occur, memory access-permission flags, and other suitable arguments. With a loading function, the address of the memory buffer is an example of an argument that may be used. The injection process then modifies the instruction pointer to point to the function (step 306). The injection process restarts the operating system (step 308). The injection process then halts the operating system upon the return of the function (step 310). The return occurs when the function finishes executing, in these examples, with the process terminating thereafter.

Figure 4:
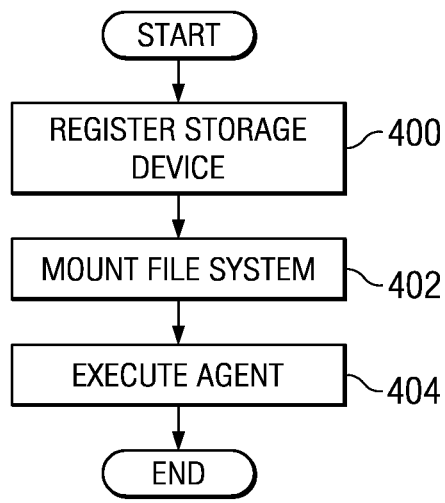
FIG. 4 is a flowchart illustrating the execution of an agent in accordance with an illustrative embodiment.

With reference next to FIG. 4, a flowchart illustrating the execution of an agent is depicted in accordance with an illustrative embodiment. The process illustrated in FIG. 4 is an example of a process that may be executed by a module, such as module 142 in FIG. 1.

The process begins by registering a storage device with the operating system (step 400). The module maps the in memory file system image. The storage device may be registered in a number of different ways. For example, in a Linux operating system, the process involves calling the register_blkdev( ) and add_disk( ) functions to provide data structure containing references to functions implementing the "device's" read, write operations. The process then calls the vfs_mknod( ) function to create an appropriate device inode in the file system mounted at /dev. Next, the module mounts the file system (step 402). The process then executes the agent in the file system (step 404), with the process terminating thereafter. At this point, the agent executes an application space within the operating system. The agent may perform various steps and/or operations depending on the particular implementation. For example, in some implementations, the agent may be a virus detection system used to monitor for viruses that may execute within the operating system in the virtual machine.

In other illustrative embodiments, the file system image may be part of the module injected into the guest operating system. This image may be loaded separately by calls out to extra-guest injection code. This code is code involved in the injection process other than the code placed into the operating system. In other embodiments, the file system image may reside in pages shared between all agents that may be present in the operating system. Alternatively, the kernel portion of the context agent may dynamically load blocks of the disk image for the file system from the security partition because of file system accesses. The injected module can contain code other than that used to achieve user-context execution of agent code, such as kernel-level utility code utilized by the user-mode context agent process. That portion of the module is the kernel portion of the context agent in these examples. This type of implementation may involve more overhead from reading the image, but the entire image does not need to be in memory all at once. Each block is requested functionally rather than through a direct shared memory access.

Thus, the different illustrative embodiments provide a computer implemented method, apparatus, and computer usable program code for injecting an agent into a virtual machine. In these examples, the injection involves using features in virtual machine introspection. The different embodiments execute a process within a virtual machine by injecting a module into an operating system for a virtual machine to form an injected module. The injected module is then executed to load an agent process within the application space in the virtual machine. Execution of the agent process is then initiated by the injected module.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable storage device providing program code for use by or in connection with a computer or any instruction execution system. For the purposes of this description, a computer readable storage device can be any tangible apparatus that can store the program for use by or in connection with the instruction execution system, apparatus, or device.

The storage device can be an electronic, magnetic, optical, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adding a program module to a kernel of an operating system in a virtual machine to load and execute an agent program in the virtual machine, the method comprising the steps of:

a computer copying the program module into a non-swappable area of memory previously allocated to the virtual machine, the computer halting execution of the operating system, the computer loading the program module for execution as part of the kernel of the operating system, the computer restarting the operating system, and the computer initiating execution of the program module in the kernel of the operating system, the program module including program instructions to load the agent program into a swappable area of memory previously allocated to the virtual machine and initiate execution of the loaded agent program as an application program whose execution is controlled by the operating system, the agent program including program instructions to perform a task;

responsive to the computer initiating execution of the program module, the computer executing the program instructions of the program module as part of the kernel of the operating system to load the agent program into the swappable area of memory and initiate execution of the loaded agent program as the application program whose execution is controlled by the operating system;

the computer executing the program instructions of the loaded agent program to perform the task responsive to the computer initiating execution of the loaded agent program, wherein the computer is another virtual machine that is privileged, and wherein the program module copying, program module loading, and program module initiated execution steps are performed by a process executing in the privileged virtual machine; and responsive to a reboot of the operating system, the program module is not present in the kernel of the operating system prior to a subsequent loading of the program module for execution as part of the kernel, and the agent program is not present as the loaded agent program prior to a subsequent execution of the program instructions in the program module to load the agent program.

2. The method of claim 1, wherein the step of the computer loading the program module for execution as part of the kernel of the operating system comprises:

the computer creating arguments corresponding to the program module for a loading function, the arguments including a location in the non-swappable area of memory where the copy of the program module is located;

wherein responsive to the step of the computer loading the program module for execution as part of the kernel of the operating system the computer modifies an instruction pointer to point to the program module; and wherein the step of the computer initiating execution of the program module in the kernel of the operating system is responsive to the instruction pointer pointing to the program module responsive to the computer restarting the operating system.

3. The method of claim 1, wherein the program instructions in the program module to load the agent program into the swappable area of memory previously allocated to the virtual machine comprise program instructions to mount a file system containing a set of components for the agent program, and wherein responsive to the step of executing the loaded agent program, the loaded agent program using the set of components to perform the task.

4. The method of claim 3, wherein the file system is located in a disk image in memory associated with the virtual machine.

5. The method of claim 4, wherein the disk image is selected from one of a first disk image that is part of the program module, a second disk image that is loaded by calls made by the computer to a code insertion process, and a third disk image residing in memory shared between a plurality of agent programs present in the virtual machine.

6. The method of claim 1, wherein the loaded agent program is a virus scanning process, the virus scanning process monitoring for viruses executing within the virtual machine.

7. A data processing system comprising:
a computer-readable, storage device;
a processor unit and a memory;
first program code to copy a program module into a non-swappable area of memory previously allocated to a virtual machine, halt execution of an operating system in the virtual machine, load the program module for execution as part of a kernel of the operating system, restart the operating system, and initiate execution of the program module in the kernel of the operating system, the program module including program instructions to load an agent program into a swappable area of memory previously allocated to the virtual machine and initiate execution of the loaded agent program as an application program whose execution is controlled by the operating system, the agent program including program instructions to perform a task;
second program code to execute the program instructions of the program module as part of the kernel of the operating system to load the agent program into the swappable area of memory and initiate execution of the loaded agent program as the application program whose execution is controlled by the operating system, responsive to the initiated execution of the program module; and
third program code to execute the program instructions of the loaded agent program to perform the task, responsive to the initiated execution of the loaded agent program, wherein responsive to a reboot of the operating system, the program module is not present in the kernel of the operating system prior to a subsequent loading of the program module for execution as part of the kernel, and the agent program is not present as the loaded agent program prior to a subsequent execution of the program instructions in the program module to load the agent program, and wherein the first program code, the second program code, and the third program code are stored in the computer-readable, storage device for execution by the processor unit via the memory, and wherein the processor unit is another virtual machine that is privileged, and wherein the first program code, the second program code, and the third program code are performed by a process executing in the privileged virtual machine.

8. The data processing system of claim 7, wherein the first program code to load the program module for execution as part of the kernel of the operating system comprises:
program code to create arguments, corresponding to the program module, for a loading function, the arguments including a location in the non-swappable area of memory where the copy of the program module is located;
wherein the first program code to load the program module for execution as part of the kernel of the operating system includes program code to modify an instruction pointer to point to the program module; and
wherein the first program code to initiate execution of the program module in the kernel of the operating system is responsive to the instruction pointer pointing to the program module responsive to the first program code restarting the operating system.

9. The data processing system of claim 7, wherein the program instructions in the program module to load the agent program into the swappable area of memory previously allocated to the virtual machine comprise program instructions to mount a file system containing a set of components for the agent program, and wherein responsive to executing the loaded agent program, the loaded agent program using the set of components to perform the task.

10. The data processing system of claim 9, wherein the file system is located in a disk image in memory associated with the virtual machine.

11. The data processing system of claim 10, wherein the disk image is selected from one of a first disk image that is part of the program module, a second disk image that is loaded by calls made by the first program code to a code insertion process, and a third disk image residing in memory shared between a plurality of agent programs present in the virtual machine.

12. A computer program product for adding a program module to a kernel of an operating system in a virtual machine to load and execute an agent program in the virtual machine, the computer program product comprising:
a computer-readable storage device; and
program code, stored on the computer-readable, storage device, for copying the program module into a non-swappable area of memory previously allocated to the virtual machine, halting execution of the operating system, loading the program module for execution as part of the kernel of the operating system, restarting the operating system, and initiating execution of the program module in the kernel of the operating system, the program module including program instructions to load the agent program into a swappable area of memory previously allocated to the virtual machine and initiate execution of the loaded agent program as an application program whose execution is controlled by the operating system, the agent program including program instructions to perform a task;
program code, stored on the computer-readable storage device, for executing the program instructions of the program module as part of the kernel of the operating system to load the agent program into the swappable area of memory and initiate execution of the loaded agent program as the application program whose execution is controlled by the operating system, responsive to the initiated execution of the program module;
program code, stored on the computer-readable storage device, for executing the program instructions of the loaded agent program to perform the task, responsive to the initiated execution of the loaded agent program, wherein the program code, stored on the computer-readable storage device is program code for execution on another virtual machine that is privileged; and
wherein responsive to a reboot of the operating system, the program module is not present in the kernel of the operating system prior to a subsequent loading of the program module for execution as part of the kernel, and the agent program is not present as the loaded agent program prior to a subsequent execution of the program instructions in the program module to load the agent program.

13. The computer program product of claim 12, wherein the program code for loading the program module for execution as part of the kernel of the operating system comprises:
program code for creating arguments, corresponding to the program module, for a loading function, the arguments including a location in the non-swappable area of memory where the copy of the program module is located;
wherein the program code for loading the program module for execution as part of the kernel of the operating system includes program code for modifying an instruction pointer to point to the program module; and
wherein the program code for initiating execution of the program module in the kernel of the operating system includes program code for restarting the operating system and is responsive to the instruction pointer pointing to the program module and is further responsive to a restarting of the operating system by the program code for restarting the operating system.

14. The computer program product of claim 12, wherein the program instructions in the program module to load the agent program into the swappable area of memory previously allocated to the virtual machine comprise program instructions to mount a file system containing a set of components for the agent program, and wherein responsive to executing the loaded agent program, the loaded agent program using the set of components to perform the task.

15. A computer for adding a program module to a kernel of an operating system in a virtual machine to load and execute an agent program in the virtual machine, the computer comprising:
a processor unit;
a computer-readable memory;
a computer-readable, storage device; and
first program instructions for halting execution of the operating system, allocating memory in the computer, placing the program module into the allocated memory, restarting the operating system, and initiating execution of the program module in the kernel of the operating system, wherein the program module loads the agent program into the virtual machine and initiates execution of the loaded agent program as an application program whose execution is controlled by the operating system, and wherein the first program instructions are stored in the computer-readable, storage device for execution by the processor unit via the computer-readable memory, and wherein the processor unit is another virtual machine that is privileged, and wherein the first program code is performed by a process executing in the privileged virtual machine.

* * * * *